(12) United States Patent
Tanaka et al.

(10) Patent No.: US 6,190,774 B1
(45) Date of Patent: Feb. 20, 2001

(54) LIQUID CRYSTAL DISPLAY CELL SPACER AND LIQUID CRYSTAL DISPLAY CELL

(75) Inventors: Susumu Tanaka; Kunikazu Yamada, both of Shiga (JP)

(73) Assignee: Sekisui Chemical Co., Ltd., Osaka (JP)

( * ) Notice: Under 35 U.S.C. 154(b), the term of this patent shall be extended for 0 days.

(21) Appl. No.: 09/125,315

(22) PCT Filed: Feb. 14, 1997

(86) PCT No.: PCT/JP97/00386

§ 371 Date: Aug. 14, 1998

§ 102(e) Date: Aug. 14, 1998

(87) PCT Pub. No.: WO97/30374

PCT Pub. Date: Aug. 21, 1997

(30) Foreign Application Priority Data

Feb. 14, 1996 (JP) .................................... 8-026621
Feb. 14, 1996 (JP) .................................... 8-26622

(51) Int. Cl.$^7$ ................................................ G02F 1/1339
(52) U.S. Cl. ........................... 428/407; 428/403; 428/1.5; 349/157
(58) Field of Search ................... 428/403, 1.5, 407; 423/449.1; 349/155, 157

(56) References Cited

U.S. PATENT DOCUMENTS

| | | | |
|---|---|---|---|
| 5,053,278 | * 10/1991 | Nakada et al. | 428/407 |
| 5,130,831 | * 7/1992 | Kohara et al. | 349/155 |
| 5,151,326 | * 9/1992 | Matsuda et al. | 428/407 |
| 5,153,068 | 10/1992 | Kohara et al. | 428/405 |

FOREIGN PATENT DOCUMENTS 0 755 986 A2  1/1997 (EP) .

OTHER PUBLICATIONS

Patent Abstracts of Japan, JP 06–122834, 06/05/94, abstract.

* cited by examiner

Primary Examiner—Alexander S. Thomas
(74) Attorney, Agent, or Firm—Connolly, Bove, Lodge & Hutz LLP

(57) ABSTRACT

The present invention relates to a liquid crystal display cell spacer with improved in coloring effect and light shielding effect and optimal electrical, physical, chemical, and optical properties and a liquid crystal display cell with use thereof. A liquid crystal display cell spacer comprising surface-coated carbon black; a liquid crystal display cell spacer comprising a pigment component comprising carbon black and at least one set of organic pigments of dissimilar colors other than carbon black; and a liquid crystal display cell spacer comprising a pigment component comprising surface-coated carbon black and at least one set of organic pigments of dissimilar colors other than carbon black. A liquid crystal display cell with use any of above liquid crystal display cell spacers.

7 Claims, 1 Drawing Sheet

LIQUID CRYSTAL DISPLAY CELL SPACER AND LIQUID CRYSTAL DISPLAY CELL

TECHNICAL FIELD

The present invention relates to a liquid crystal display cell spacer with improved in coloring effect and light shielding effect and to a liquid crystal display cell with use thereof.

BACKGROUND ART

While the liquid crystal display cell has been used widely in a variety of electronic equipment such as personal computers and portable electronic devices, there has been much need for improving its performance by increasing its display contrast of images. Japanese Kokai Publication Sho-57-189117 discloses such a technology which comprises disposing two transparent electrode-carrying substrates with the respective electrodes facing each other and a liquid crystal hermetically sandwiched between said substrates, with particles of a colored spacer being dispersed on the entire surfaces of the substrates which are adjoining to the liquid crystal so as to prevent deterioration of the display contrast of images.

The liquid crystal display cell spacer for such a high-contrast liquid crystal display cell must have been colored to a deep shade. While many production methods have heretofore been proposed for the fabrication of such a liquid crystal display cell spacer, they can be roughly divided into the technology which comprises dyeing polymer particles previously manufactured and the technology which comprises dyeing polymer particles in the course of their manufacture.

The technology which comprises dyeing polymer particles previously manufactured includes the following processes.

Japanese Kokai Publication Hei 1-144429 describes a process which comprises treating polymer particles with an acid and then dyeing them. Japanese Kokai Publication Hei-1-207719 discloses a process which comprises subjecting polymer particles to heat treatment at 200 to 700° C. to provide flame-resistant sintered particles. Japanese Kokai Publication Hei-5-165033 discloses a process which comprises coating polymer particles with a conjugated polymer such as polyacetylene. Japanese Kokai Publication Hei-1-200227 describes a process which comprises disposing a metallic layer on the surface of crosslinked polymer particles and oxidizing the metal to the metal oxide.

Japanese Kokai Publication Hei-4-15623 discloses a process which comprises striking ultrafine black metal oxide particles into the surface layers of organic polymer particles, while Japanese Kokai Publication Hei-3-101713 discloses a process which comprises dispersing particles of a polymer containing anionic functional groups in a solution containing an oxidizing agent to let the oxidizing agent adsorbed or impregnated, adding at least one member selected from the group consisting of 5-membered heterocyclic compounds and aromatic hydrocarbons, and causing the mixture to undergo chemical oxidative polymerization. Disclosed in Japanese Kokoku Publication Hei-4-27242 is a process in which particles of a water-soluble polymer available upon polymerization of an ethylenically unsaturated sulfonic acid compound or a salt thereof are dyed with a basic dye.

Furthermore, Japanese Kokai Publication Hei-3-351639 discloses a process which comprises dyeing polymer particles comprising amino resin with an acidic dye in the presence of a solvent at high temperature, while Japanese Kokai Publication Hei-4-363331 discloses a process which comprises dispersing an oily solution of an oily dye uniformly in an aqueous medium, mixing the resulting dye emulsion with an emulsion of polymer particles so as to dye the particles.

However, this technology of coloring polymer particles prepared beforehand not only entails high production costs but also has the drawback that the performance and quality charcteristics of the final product cannot be easily controlled.

The technology which comprises dyeing polymer particles in the course of their manufacture includes the following and other processes. Japanese Kokoku Publication Sho-50-33821, Japanese Kokoku Publication Sho-56-50883, and Japanese Kokoku Publication Hei-4-89805 disclose technologies for producing liquid crystal display cell spacers in which a polymerizable monomer is suspension-polymerized in the presence of a pigment. However, these methods have limitations in the kind of polymerizable monomer that can be used and in production scale and, moreover, the incorporated pigment tends to be exposed on the spacer surface with the result that the pigment itself dissolves out upon exposure to an organic solvent or the like or that impurities in the pigment are liable to dissolve out.

Japanese Kokoku Publication Hei-4-59321 discloses a process for producing a liquid crystal display cell spacer which comprises mixing a lipophilicity-imparted pigment with a monomeric component comprising a polyfunctional vinyl compound and an lipophilic vinyl compound and subjecting the mixture to suspension-polymerization in an aqueous medium. This process is conducive to improvements in the dispersibility of the pigment and solvent resistance but in order to insure a substantial absence of the pigment on the spacer surface, the vinyl compound must be subjected to a suspension polymerization or emulsion polymerization as a post-treatment. Since this process involves two stages of polymerization, the production cost is high of necessity.

Japanese Kokai Publication Hei-7-2913 describes a process for producing a liquid crystal display cell spacer which comprises mixing a pigment uniformly with a (meth) acrylonitrile-containing polyfunctional ethylenically unsaturated component and subjecting the mixture to suspension polymerization in an aqueous medium. However, this technology cannot provide a liquid crystal display cell spacer colored to a deep shade, for although it is conducive to improvements in the dispersibility of the pigment and the mechanical strength and solvent resistance of the spacer, the impurities in the pigment tend to dissolve and diffuse into the spacer to reduce its electrical resistance of the spacer, so that there is a limit to the proportion of the pigment that can be added.

Thus, by the technology of coloring polymer particles in the course of manufacture thereof, too, it is difficult to obtain a liquid crystal display cell spacer with good coloring effect and light shielding effect and physical properties necessary for a spacer in an expedient and efficient manner.

SUMMARY OF THE INVENTION

The present invention has for its object to solve the above problems and accordingly provide a liquid crystal display cell spacer with improved coloring effect and light shielding effect and satisfactory electrical, physical, chemical, and optical properties and a liquid crystal display cell with use thereof.

The present invention relates, in a first aspect, to a liquid crystal display cell spacer comprising surface-coated carbon black. This liquid crystal display cell spacer can be advantageously applied to liquid crystal display cells.

The present invention relates, in a second aspect, to a liquid crystal display cell spacer comprising a pigment component comprising carbon black and at least one set of organic pigments of dissimilar colors other than carbon black. This liquid crystal display cell spacer can be advantageously applied to liquid crystal display cells.

The present invention relates, in a third aspect, to a liquid crystal display cell spacer comprising a pigment component comprising surface-coated carbon black and at least one set of organic pigments of dissimilar colors other than carbon black. This liquid crystal display cell spacer can be advantageously applied to liquid crystal display cell.

The present invention relates, in a fourth aspect, to a liquid crystal display cell comprising the liquid crystal display cell spacer according to said first, second, or third aspect of the invention.

DISCLOSURE OF THE INVENTION

Figure 1:
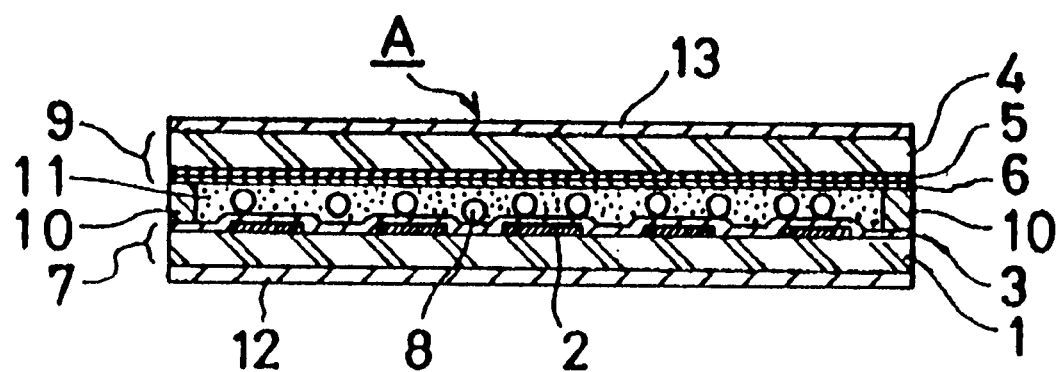
FIG. 1 is a sectional view showing one embodiment of the liquid crystal display cell according to the present invention; in which the reference numeral 1 represents a transparent substrate, 2 a transparent electrode, 3 an alignment layer, 4 a transparent substrate, 5 a transparent electrode, 6 an orientation control film, 7 a substrate, 8 a spacer, 9 a substrate, 10 a sealing member, 11 nematic liquid crystals, 12 a polarizing sheet, and 13 a polarizing sheet.

The first aspect of the present invention relates to a liquid crystal display cell spacer comprising surface-coated carbon black.

The carbon black for use in this first aspect of the invention has a coated surface which precludes dissolution and diffusion of its impurities. By using this surface-coated carbon black, the electrical resistance of the liquid crystal display cell spacer can be prevented from reducing even if its proportion is increased and, moreover, the dispersibility of carbon black is improved so that sufficiently deep black shading of the spacer can be achieved with a smaller amount of carbon black. The coating can be applied by, for example, using a thermoplastic resin.

As used throughout this specification, the term "impurities" means the contaminants which are unavoidably contained in ordinary carbon black and, if dissolved out and diffused into the liquid crystal display cell spacer, reduce the electrical resistance of the spacer, such as sodium ion, potassium ion, chloride ion, and sulfate ion, among others.

The carbon black for said surface-coated carbon black is not particularly restricted in kind, thus including but not limited to channel black, roll black, furnace black, and thermal black.

The thermoplastic resin is not particularly restricted in kind but includes alkyd resin, modified alkyd resin, phenolic resin, natural resin-modified phenolic resin, maleic acid resin, natural resin-modified maleic acid resin, fumaric acid resin, ester gum, rosin, petroleum resin, coumarone resin, indene resin, polyester resin, polyamide resin, polycarbonate resin, polyethylene resin, epoxy resin, styrene resin, vinyl resin, acrylic resin, chlorinated rubber, benzoguanamine resin, urea resin, etc. These resins may be used independently or in combination.

The technique for coating the surface of carbon black with the above-mentioned thermoplastic resin is not restricted. A typical method comprises pulverizing carbon black in the presence of a hydrophobic medium containing said thermoplastic resin by means of a crusher such as a ball mill or the like. An alternative method comprises mixing an aqueous dispersion of carbon black with a hydrophobic medium containing said thermoplastic resin to prepare an emulsion and removing water by heating. In a further alternative process, a hydrophobic medium containing said thermoplastic resin is heated beforehand, an aqueous dispersion of carbon black is added with stirring, and the water is simultaneously distilled off. The surface-coated carbon black thus obtained can be precipitated by mixing the system with a lower alcohol, e.g. ethanol or isopropyl alcohol, which is miscible with the hydrophobic medium, and recovered by filtration or decantation.

The liquid crystal display cell spacer according to the first aspect of the invention can be produced by dispersing said surface-coated carbon black uniformly in a polymerizable monomer and subjecting the dispersion to polymerization reaction. The method for this polymerization is not particularly restricted. Thus, for example, suspension polymerization and emulsion polymerization can be mentioned. Particularly in order to provide a uniformly colored liquid crystal display cell spacer, a suspension polymerization process is preferred.

The suspension polymerization is carried out by dispersing said surface-coated carbon black uniformly in said polymerizable monomer and subjecting the dispersion to polymerization in the presence of a polymerization initiator in an aqueous medium.

There is no particular limitation on the polymerizable monomer that can be used, thus including unsaturated carboxylic acids such as acrylic acid, methacrylic acid, maleic acid, maleic anhydride, fumaric acid, crotonic acid, itaconic acid, etc.; acrylic esters such as methyl acrylate, ethyl acrylate, n-propyl acrylate, isopropyl acrylate, n-butyl acrylate, t-butyl acrylate, 2-ethylhexyl acrylate, stearyl acrylate, etc.; methacrylic esters such as methyl methacrylate, ethyl methacrylate, propyl methacrylate, n-butyl methacrylate, t-butyl methacrylate, 2-ethylhexyl methacrylate, lauryl methacrylate, stearyl methacrylate, dodecyl methacrylate, glycidyl methacrylate, β-hydroxyethyl methacrylate, hydroxymethyl methacrylate, etc.; styrenic monomers such as styrene, vinyltoluene, α-methylstyrene, p-methoxystyrene, t-butylstyrene, chlorostyrene, etc.; diene type monomers such as butadiene, isoprene, etc.; ethylene, vinyl chloride, vinyl acetate, vinyl propionate, acrylamide, methacrylamide, acrylonitrile, methylolacrylamide, vinyl stearate, acryl acetate, diallyl adipate, dimethyl itaconate, diethyl maleate, allyl alcohol, vinylidene chloride, vinylpyridine, N-vinylpyrrolidone, N-hydroxyacrylamide, 2-vinyl-2-oxazoline, 2-isopropenyl-2-oxazoline, dimethylaminoethyl acrylate, glycidyl methacrylate, allyl glycidyl ether, monomethyl fumarate, etc. These monomers can be used independently or in combination and there is no particular limitation on the kinds of monomers to be used in combination.

In addition to the polymerizable monomer mentioned above, one or more other crosslinking compounds can be optionally employed. Among such optional monomers can be mentioned aromatic divinyl compounds such as divinylbenzene, divinylnaphthalene and their derivatives; diethylenically or triethylenically unsaturated carboxylic esters such as ethylene glycol di(meth)acrylate, diethylene glycol di(meth) acrylate, triethylene glycol di(meth)acrylate, trimethylolpropane tri(meth)acrylate, 1,3-butanediol di(meth) acrylate, etc.; divinyl compounds such as N,N- divinylaniline, divinyl ether, divinyl sulfide, divinyl sulfone, etc.; and compounds each containing 3 or more vinyl groups. The preferred proportion of such crosslinking compounds is 0.005 to 100 weight percent based on the combined amount of the crosslinking compound and the polymerizable monomer.

The proportion of said polymerizable monomer per 100 parts by weight of the aqueous medium is preferably 1 to 200 parts by weight. If the proportion is less than 1 part by weight, the production cannot be profitably carried out. On the other hand, if the upper limit of 200 parts by weight is exceeded, it will be difficult to remove the heat of polymerization.

The proportion of surface-coated carbon black is preferably 0.1 to 200 parts by weight relative to 100 parts by weight of the polymerizable monomer. If the proportion is smaller than 0.1 part by weight, the spacer can hardly be colored to a deep shade. On the other hand, if the upper limit of 200 parts by weight is exceeded, the mechanical strength of the product liquid crystal display cell spacer tends to be sacrificed.

In order that the surface-coated carbon black may be uniformly dispersed in said polymerizable monomer, a mechanical device such as a ball mill, bead mill, sand mill, attriter, sand grinder, nanomizer, or the like can be used with advantage. In this operation, a dispersing agent can be used to improve dispersibility of the surface-coated carbon black.

The dispersing agent that can be used is not particularly restricted in kind. Thus, it may be any of water-soluble polymers such as polyvinyl alcohol, starch, methylcellulose, carboxymethylcellulose, hydroxyethylcellulose, poly (sodium methacrylate), etc.; barium sulfate, calcium sulfate, aluminum sulfate, calcium carbonate, calcium phosphate, talc, clay, diatomaceous earth, metal oxide powder, etc.

The proportion of said dispersing agent is 0.01 to 20 weight % based on the polymerizable monomer component.

The aqueous medium that can be used is not particularly restricted in kind and may for example be an aqueous solution of a water-soluble organic compound such as polyvinyl alcohol, polyacrylic acid, polymethacrylic acid, gelatin, methylcellulose, polymethacrylamide, polyethylene glycol, polyethylene oxide monostearate, sorbitan tetraoleate, glycerin monooleate, dodecylbenzenesulfonic acid, etc., as well as water.

In the above aqueous medium is in a microfine fashion suspended a uniform dispersion of surface-coated carbon black in said polymerizable monomer. This suspending operation can be carried out using a homogenizer or the like.

The reaction temperature preferred for said suspension polymerization is 20 to 100° C. If the temperature is below 20° C. the polymerization reaction rate will not be acceptably high. On the other hand, if the reaction temperature exceeds 100° C., the polymerization reaction can hardly be controlled.

The suspension polymerization time is preferably 1 to 50 hours. If the reaction time is less than 1 hour, the rate of polymerization will be too low. On the other hand, a prolonged reaction over 50 hours is unnecessary.

The liquid crystal display cell spacer obtained by the 5 above suspension polymerization reaction can be separated by filtration, centrifugation or other known procedure. The separated liquid crystal display cell spacer is rinsed with water or the like and dried by heating or in vacuo.

The polymerization initiator that can be used in said suspension polymerization is not particularly restricted, thus including but not limited to azo compounds such as 2,2'-azobisisobutyronitrile, 2,2'-azobis-2,4'-dimethylvaleronitrile, 2,2'-azobis-methylbutyronitrile, 2,2'-azobis-methylheptonitrile, 2,2'-azobis-2,3-dimethylbutyronitrile, 2,2'-azobis-2,3,3-trimethylbutyronitrile, 2,2'-azobis-2-isopropylbutyronitrile, 4,4-azobis-4-cyanovaleric acid, dimethyl-2,2'-azobisisobutyrate, etc. and organic peroxides such as acetyl peroxide, decanoyl peroxide, lauroyl peroxide, benzoyl peroxide, octanoyl peroxide, orthomethoxybenzoyl peroxide, p-chlorobenzoyl peroxide, 2,4-dichlorobenzoyl peroxide, diisopropyl peroxycarbonate, 2-ethylhexyl peroxydicarbonate, acetyl cyclohexanesulfonyl peroxide, t-butyl peroxyisobutyrate, t-butyl peroxypivarate, t-butyl peroxy-2-ethylhexanoate, di-t-butyl peroxide, t-butyl cumyl peroxide, dicumyl peroxide, methyl ethyl ketone peroxide, cumene hydroperoxide, t-butyl hydroperoxide, etc.

The amount of said polymerization initiator is 0.01 to 30 parts by weight based on 100 parts by weight of the polymerizable monomer. If the proportion is smaller than 0.01 part by weight, the rate of polymerization reaction will be too low. On the other hand, addition of the initiator in excess of 30 parts by weight is unnecessary. The preferred range is 0.1 to 10 parts by weight.

The preferred liquid crystal display cell spacer according to the first aspect of the present invention has a mean particle diameter of 0.5 to 500 μm. If the mean particle diameter is less than 0.5 μm, the particles tend to coagulate and will not be practically useful. The spacer with a mean particle diameter exceeding 500 μm will find little application. The preferred range is 1 to 300 μm.

The coefficient of variation of the particle size of the liquid crystal display cell spacer according to the first aspect of the present invention is preferably not greater than 20%. If the coefficient of variation exceeds 20%, the particle size distribution will be too broad so that the performance of the spacer tends to be sacrificed. More preferably, the coefficient of variation is not greater than 10%. For still better results, the coefficient is not greater than 5%.

In order to preclude dissolution and diffusion of impurities etc. (inclusive of the pigment itself) and impart an interfacial chemical modification to the surface of the liquid crystal display cell spacer, the spacer surface may be coated with a coating material such as a silane coupling agent as necessary. The coating agent is preferably applied in a monomolecular layer or as a thin polymer film.

The silane coupling agent that can be used as above is not particularly restricted, thus including but not limited to amino silane coupling agents such as γ-aminopropyltrimethoxy silane, N-β-(aminoethyl)-γ-aminopropyltrimethoxysilane, 3-[N-allyl-N-(2-aminoethyl)]aminopropyltrimethoxysilane, 3-(N-allyl-N-glycidyl)aminopropyltriethoxysilane, 3-(N-allyl-N-methacryl)aminopropyltrimethoxysilane, 3-(N,N-diglycidyl)aminopropyltrimethoxysilane, etc.; amide silane coupling agents such as N,N-bis[3-(methyldimethoxysilyl)propyl]amine, N,N-bis[3-(trimethoxysilyl)propyl]amine, N,N-bis[3-(methyldimethoxysilyl)propyl]ethylenediamine, N,N-bis[3-(trimethoxysilyl)propyl]ethylenediamine, N-glycidyl-N,N-bis[3-(methyldimethoxysilyl)propyl]amine, N-glycidyl-N,N-bis[3-(trimethoxysilyl)propyl]amine, etc., vinyl silane coupling agents such as vinyltriethoxysilane, vinyl-tris(2-methoxyethoxy)silane, etc.; methacrylic silane coupling agents such as γ-methacryloxypropyltrimethoxysilane etc.; glycidyl silane coupling agents such as γ-glycidoxypropyltrimethoxysilane etc.; and mercaptosilane coupling agents such as γ-mercaptopropyltrimethoxysilane etc.

There is no particular limitation on the method for covering the surface of the liquid crystal display cell spacer with said coating agent. A typical method comprises mixing the coating agent with the liquid crystal display cell spacer in an inorganic solvent such as water or an organic solvent such as alcohol, heating the mixture with stirring, thereafter separating the liquid crystal display cell spacer by, for example, decantation, and finally removing the solvent by drying in vacuo. An alternative method comprises mixing said coating agent with the liquid crystal display cell spacer directly and heating the mixture.

The liquid crystal display cell spacer according to the first aspect of the present invention comprises a surface-coated carbon black and, therefore, is free from the dissolution and diffusion of any impurities in the carbon black, with the result that not only a uniform deep black shade but also a high solvent resistance can be obtained. Furthermore, the surface-coated carbon black is suppressed in the loss of electrical resistance and improved in dispersibility compared with the uncoated carbon black, with the result that it is uniformly dispersed and imparts a higher degree of darkness to the liquid crystal display cell spacer.

The second aspect of the present invention relates to a liquid crystal display cell spacer which comprises a pigment component comprising carbon black and at least one set of organic color pigments of dissimilar colors other than carbon black.

There is no particular limitation on the kind of carbon black that can be used, thus including but not limited to acetylene black, channel black, and furnace black. In this second aspect of the invention, a surface-treated carbon black such as Microlith (Ciba-Geigy) can be used for improved in carbon black dispersibility.

Referring to said one set of organic color pigments of dissimilar colors other than carbon black, those organic color pigments which are comparatively high in transparency and high in heat resistance, weather resistance, and solvent resistance are preferably used. Particularly preferred is a set of organic color pigments which, upon admixture, give a substantially black shade. In this second aspect of the invention, at least one such set of organic color pigments is used.

The color pigments constituting said set of organic color pigments of dissimilar colors other than carbon black are not restricted in kind but can for example be selected from among azo and condensed azo organic color pigments such as Brilliant Carmine BS, Lake Carmine FB, Brilliant Fast Scarlet, Lake Red 4R, Permanent Red R, Fast Red FGR, Toluidine Maroon, Bisazo Yellow, Fast Yellow G, Bisazo Orange, Vulcan Orange, Pyrazolone Red, etc.; organic color pigments in the phthalocyanine series, such as phthalocyanine Blue, Fast Sky Blue, phthalocyanine Green, etc.; lake series organic color pigments such as Lake Yellow, Rose Lake, Violet Lake, Blue Lake, Green Lake, etc.; oxazine series organic color pigments; and quinophthalone series organic color pigments, among others.

Referring to said one set of organic color pigments of dissimilar colors other than carbon black, two or more of the above-mentioned color pigments can be selectively employed.

The combination of said organic color pigments constituting said one set of organic color pigments of dissimilar colors other than carbon black is preferably such that when said at least one set of organic color pigments of dissimilar colors other than carbon black is used in conjunction with said carbon black, the maximum spectral transmittance of the liquid crystal display cell spacer according to the second aspect of the present invention over the entire visible wavelength region from about 400 to about 700 nm is less than 3% and the total light transmittance over the entire visible wavelength region is 0.1 to 2.5%. The more preferred combination is such that the maximum spectral transmittance value is less than 2.7% and the total light transmittance value is 0.2 to 2.0%.

There is no particular limitation on such combination. For example, such combinations as blue and violet pigments, red and blue pigments, yellow, blue, and violet pigments, green, blue, and violet pigments, and red, blue, and violet pigments can be mentioned.

From the standpoints of optical transmittance and uniformity of film surface, the organic pigments are preferably not greater than 1 $\mu$m in particle diameter.

In the pigment component, the preferred proportion of said carbon black is 5 to 60 weight % and the preferred proportion of said at least one set of organic color pigments of dissimilar colors other than said carbon black is 95 to 40 weight %. If the proportion of said carbon black is less than 5 weight % and the proportion of said at least one set of organic color pigments of dissimilar colors other than said carbon black is greater than 95 weight %, the excessive amount of said at least one set of organic color pigments other than said carbon black tends to detract from the mechanical strength of the liquid crystal display cell spacer according to the second aspect of the present invention.

If the proportion of said carbon black exceeds 60 weight % and that of said at least one set of organic color pigments of dissimilar colors other than said carbon black is less than 40 weight %, the excessive amount of carbon black leads to an amplified influence of impurities dissolving and diffusing out of the carbon black so that the electrical resistance of the liquid crystal display cell spacer of the second aspect of the invention tends to be decreased. More preferably, the proportion of said carbon black is 10 to 40 weight % and that of said at least one set of organic color pigments of dissimilar colors other than carbon black is 90 to 60 weight %

If the pigment component consists solely of said at least one set of organic color pigments of dissimilar colors other than said carbon black, even if the color pigments constitute the optimum combination for rendition of sufficient darkness, the increased amount of said set of organic color pigments may detract from the mechanical strength of the liquid crystal display cell spacer.

Since the color component of the liquid crystal display cell spacer of the second aspect of the invention comprises carbon black and at least one set of organic color pigments of dissimilar colors other than carbon black, the necessary amount of carbon black can be smaller so that the dissolution and diffusion of impurities are decreased. Moreover, the decrease in electrical resistance can be prevented and, at the same time, sufficient darkness and satisfactory physical properties can be secured.

The liquid crystal display cell spacer according to the second aspect of the invention can be obtained by dispersing said pigment component comprising said carbon black and said at least one set of organic color pigments of dissimilar colors other than said carbon black uniformly in a polymerizable monomer and causing the mixture to polymerize. There is no particular limitation on the method of polymerization. Thus, suspension polymerization and emulsion polymerization can be mentioned by way of example but in order to obtain a uniformly colored liquid crystal display cell spacer, a suspension polymerization process is preferred.

The suspension polymerization process comprises dispersing said pigment component uniformly in said polymerizable monomer and causing the mixture to polymerize in the presence of a polymerization initiator in aqueous medium.

The polymerizable monomer that can be used includes the same monomers as mentioned for the first aspect of the invention.

One or more suitable crosslinking compounds can be used in combination with said polymerizable monomer. The kind of crosslinking compound and its proportion may be similar to those mentioned for the first aspect of the invention.

The proportion of said pigment component is preferably 1 to 180 parts by weight based on 100 parts by weight of said polymerizable monomer. If the proportion is less than 1 part by weight, the cell spacer may hardly be colored to a deep shade, while the mechanical strength of the spacer tends to be sacrificed if the pigment component accounts for more than 180 parts by weight. The particularly preferred range is 3 to 160 parts by weight.

For dispersing said pigment component uniformly in said polymerizable monomer, the same machine as mentioned for the first aspect of the invention, for instance, can be employed.

A dispersing agent may be added for improved dispersibility of said pigment component. The kind of dispersing agent and its amount may be similar to those mentioned for the first aspect of the invention.

The aqueous medium may also be the same medium as mentioned for the first aspect of the invention.

A uniform dispersion of the pigment component in the polymerizable monomer is suspended in a microfine fashion in said aqueous medium. This suspending operation can be performed using a homogenizer or the like.

The temperature of suspension polymerization may be similar to that mentioned for the first aspect of the invention.

The polymerization time of suspension polymerization may be similar to that mentioned for the first aspect of the invention.

The liquid crystal display cell spacer obtained by the above suspension polymerization can be isolated by, for example, filtration or centrifugation. The isolated spacer is rinsed with water or the like and dried by heating or in vacuo.

The polymerization initiator and its amount may for example be similar to those mentioned for the first aspect of the invention.

The mean particle diameter and coefficient of variation of particle size of the liquid crystal display cell spacer according to the second aspect of the invention may be similar to those mentioned for the first aspect of the invention.

Where necessary, the liquid crystal display cell spacer according to the second aspect of the present invention may have been surface-coated with a coating material such as a silane coupling agent. The silane coupling agent can be selected from among the compounds mentioned for the first aspect of the invention.

Since the liquid crystal display cell spacer according to the second aspect of the invention contains a pigment component comprising carbon black and at least one set of organic color pigments of dissimilar colors other than carbon black, it not only assumes a deep black color despite the small proportion of the pigment component but also has satisfactory electrical resistance. Moreover, chances for contamination of the liquid crystals due to the pigment component are minimized.

The third aspect of the present invention is a liquid crystal display cell spacer comprising a pigment component comprising surface-coated carbon black and at least one set of organic color pigments of dissimilar colors other than carbon black.

The carbon black for use in this third aspect of the invention has been surface-coated for preventing the dissolution and diffusion of impurities. The surface-coated carbon black may be selected from among those species of carbon black mentioned for the first aspect of the invention.

The above-mentioned set of organic color pigments of dissimilar colors other than carbon black and its proportion can be similar to those mentioned for the second aspect of the invention.

The liquid crystal display cell spacer according to the third aspect of the invention can be produced by using said surface-coated carbon black in otherwise the same manner as described for the liquid crystal display cell spacer according to the second aspect of the invention.

The mean particle diameter and coefficient of variation of particle size of the liquid crystal display cell spacer according to the third aspect of the invention are similar to those mentioned for the first aspect of the invention.

Where necessary, the liquid crystal display cell spacer according to the third aspect of the invention may have been covered with a coating material such as a silane coupling agent. The silane coupling agent may be selected from among the compounds mentioned for the first aspect of the invention.

Since the liquid crystal display cell spacer according to the third aspect of the invention contains a surface-coated carbon black, there is little dissolution and diffusion of impurities into the spacer. This effect coupled with the effect of concomitant use of at least one set of organic color pigments of dissimilar colors other than carbon black results in a black shade even if the smaller amount of carbon black is used as compared with the first and the second aspect of the invention and insures high solvent resistance, electrical resistance and mechanical strength.

The fourth aspect of the present invention is a liquid crystal display cell incorporating said liquid crystal display cell spacer according to the first, second, or third aspect of the present invention.

The liquid crystal display cell according to the fourth aspect of the invention gives an excellent display image contrast without the spacer being visually recognized as luminescent spots in the dark or black area of the image.

An embodiment of the liquid crystal display cell according to the fourth aspect of the invention is. now described with reference to the accompanying drawings.

As shown in FIG. 1, a liquid crystal display cell A comprises a pair of substrates 7, 9, a spacer 8, a sealing member 10, a nematic liquid crystalline component 11, and polarizing sheets 12, 13.

The spacer 8 is disposed between the substrates 7 and 9 constituting said pair for the purpose of maintaining a predetermined gap between the substrates 7 and 9. The sealing member 10 is disposed around said pair of substrates 7, 9. The nematic liquid crystal line component 11 is sealed in the space between said substrates 7 and 9. The polarizing sheets 12 and 13 are bonded to the surfaces of the substrates 7 and 9, respectively.

Each of the substrates 7 and 9 comprises a transparent glass substrate 1 or 4 with a transparent electrode 2 or 5 formed upon a pattern on one side thereof and an alignment layer 3 or 6 (e.g. a polyimide film) coated on the surface of the transparent electrode (2 or 5)-transparent substrate (1 or 4) assembly. The alignment layer 3 or 6 has been treated to control alignment by rubbing.

The spacer 8 is a liquid crystal display cell spacer according to the first, second, or third aspect of the invention.

BEST MODE FOR CARRYING OUT THE INVENTION

The following examples are intended to illustrate the present invention in further detail and should by no means be construed as defining the scope of the invention.

EXAMPLE 1

Preparation of a Liquid Crystal Cell Spacer

To a uniform mixture of 60 parts by weight of tetramethylolmethane triacrylate, 20 parts by weight of divinylbenzene, and 20 parts by weight of acrylonitrile was added 12 parts by weight of polyethylene-coated carbon black and the carbon black was uniformly dispersed by means of a bead mill for 48 hours.

This colored polymerizable monomer mixture in which said surface-coated carbon black had been dispersed was evenly mixed with 2 parts by weight of benzoyl peroxide and the mixture was poured in 850 parts by weight of a 3 weight % aqueous solution of polyvinyl alcohol. After thorough stirring, the mixture was suspended with a homogenizer so that the diameter of droplets of the colored polymerizable monomer would be about 3 to 10 $\mu$m to provide a suspension.

This suspension was transferred to a 2-L separable flask equipped with a thermometer, stirrer, and reflux condenser and heated at 85° C. in a nitrogen gas atmosphere with constant stirring. This polymerization reaction was carried out for 7 hours, at the end of which time the temperature was increased to 90° C. and the reaction mixture was maintained at that temperature for 3 hours to carry the polymerization reaction to completion. This polymerization reaction mixture was cooled and the resulting colored particles were recovered by filtration, rinsed well with water, and dried to provide 120 parts by weight of colored particles containing dispersing pigment within the size range of 3 to 10 $\mu$m. These colored particles were subjected to classification to provide a liquid crystal display cell spacer with a mean particle diameter of 5.55 $\mu$m and a coefficient of variation in particle size of 2.48%.

The degree of darkness (light transmittance) of the liquid crystal display cell spacer thus obtained, the concentration of impurities in the spacer, and the electrical resistance of the spacer were evaluated by the following methods. The results are presented in Table 1.

Evaluation Methods (1) Degree of darkness

A mixture of the polymerizable monomer of the same composition as that of the above liquid crystal display cell spacer and the color component was polymerized to prepare a 1 mm-thick wafer. The spectral transmittance of this wafer was measured over the entire visible wavelength range of 400 to 700 nm with a spectrophotometer and the maximum value was regarded as the degree of darkness of the liquid crystal display cell spacer.

(2) The concentrations of impurities in the liquid crystal display cell spacer

Ten (10) grams of the liquid crystal display cell spacer obtained was put in 330 ml of a solvent mixture (water/isopropyl alcohol =7/3, v/v) with stirring and the mixture was allowed to stand at room temperature for one week (with stirring once a day). The mixture was allowed to stand without agitation in the final 2-day period to let the liquid crystal display cell spacer settle. The supernatant was recovered with a filter paper (0.2 $\mu$m thick), concentrated to 30 ml, and analyzed. The analyses for sodium and potassium ions were carried out with Jarrell-Ash SPQ8000 atomic absorption spectrophotometer. The analyses for chloride and sulfate ions were carried out with Dionex 2010I ion chromatographic analyzer.

(3) Electrical resistance of the liquid crystal display cell spacer

Using Toa Dempa Ultra Megohmmeter SM-8210, the liquid crystal display cell spacer was filled into the accessory liquid sample electrode and the electrical resistance of the liquid crystal display cell spacer was measured according to the instruction manual for liquid samples.

Fabrication of a TN Liquid Crystal Display Cell

In order to evaluate the performance of a liquid crystal display device incorporating the liquid crystal display cell spacer obtained, a TN liquid crystal display cell of the normally black display mode, which faciliates assessment of the light shielding effect of spacers, was fabricated. The light shielding effect of the spacer or the effect on cell gap formation as evaluated using this test liquid crystal display cell is translatable to the effect obtainable with an STN or other liquid crystal display cell, so that the results of evaluation are not exclusively valid for TN liquid crystal display cells but valid for all kinds of liquid crystal display cells.

A transparent electrically conductive indium oxide-tin oxide film was formed in a thickness of about 500 Angstrom units on a 0.7 mm-thick glass sheet by the low-temperature sputtering technique and a predetermined electrode pattern was formed by photolithography. Then, the surface was coated with an alignment material and heated to obtain an alignment layer. This glass sheet was cut to 5 cm×12.5 cm to provide glass substrates for a liquid crystal display cell.

The peripheral edge of the glass substrate obtained was then printed with a glass fiber spacer-mixed epoxy adhesive in a breadth of 1 mm by the screen printing technique.

After this glass substrate was set in a horizontal position, the liquid crystal display cell spacer was scattered over with the aid of pressurized nitrogen gas and allowed to fall uniformly on the glass substrate. The scattering time was adjusted so that the density of the liquid crystal display cell spacer particles on the glass substrate would be about 150 particles/mm$^2$.

After another glass substrate was superimposed on the liquid crystal display cell spacer-scattered glass substrate, a load of 1 kg/cm$^2$ was applied uniformly on the whole glass substrate by means of a press. At the same time, the assembly was heated at a temperature of 160° C. for 20 minutes to cure the peripheral epoxy adhesive.

After a vacuum was established in the fabricated cell by aspiration, the liquid crystal was injected from a bore formed in a part of the peripheral seal and the injection bore was closed up under a subatmospheric intracellular pressure of 0.6 atmosphere. The cell was then heated to a predetermined temperature for liquid crystal realignment to provide a finished liquid crystal display cell.

The measured gap between the top and bottom substrates of this liquid crystal display cell was 5.38 $\mu$m.

Evaluation Methods (1) Unevenness of color of the TN liquid crystal display cell Polarizing sheets were set on either surface of the liquid crystal display cell so that the color of the reflecting light of the light projected against the TN liquid crystal display cell would be olive. The olive color was uniform all over without unevenness.

The following evaluation criteria were used.
◎: no color unevenness
○: a practically acceptable degree of color unevenness spacer and a liquid crystal display cell were fabricated and evaluated as in Example 1. The results are shown in Table 1.

TABLE 1

| | | | Examples | | | | Comparative Examples | |
|---|---|---|---|---|---|---|---|---|
| | | | 1 | 2 | 3 | 4 | 1 | 2 |
| Composition (weight part) | Polymerizable monomer | Tetramethylolmethane triacrylate | 60 | 60 | 60 | — | 60 | 60 |
| | | Divinylbenzene | 20 | 20 | 20 | 50 | 20 | 20 |
| | | Acrylonitrile | 20 | 20 | 20 | — | 20 | 20 |
| | | Ethylene glycol dimethacrylate | — | — | — | 50 | — | — |
| | Carbon | Surface-coated carbon black | 12 | 6 | 18 | 12 | — | — |
| | | Carbon black | — | — | — | — | 30 | — |
| Quality and performance parameters | Spacer quality | Mean particle size ($\mu$m) | 5.55 | 3.59 | 7.12 | 4.55 | 6.05 | 5.78 |
| | | Coefficient of variation of particle size (%) | 2.48 | 2.66 | 2.85 | 2.89 | 3.71 | 4.11 |
| | | Degree of darkness (spectral transmittance) (%) | 2.6 | 3.0 | 2.2 | 2.5 | 1.5 | 75.7 |
| | | Electrical resistance ($\Omega \cdot$ cm) | $10^{14}$ | $10^{14}$ | $10^{13}$ | $10^{14}$ | $<10^{9}$ | $10^{11}$ |
| | Levels of impurities | Sodium ion (ppm) | 0.02 | 0.01 | 0.03 | 0.02 | 0.1 | 0.03 |
| | | Potassium ion (ppm) | 0.04 | 0.03 | 0.05 | 0.03 | 0.1 | 0.05 |
| | | Chloride ion (ppm) | 0.1 | 0.1 | 0.2 | 0.1 | 0.9 | 0.3 |
| | | Sulfate ion (ppm) | 0.5 | 0.4 | 0.7 | 0.6 | 1.5 | 0.5 |
| | Cell quality | Mean cell gap ($\mu$m) | 5.38 | 3.38 | 7.03 | 4.00 | 5.63 | 5.65 |
| | | Evenness of color | ◎ | ◎ | ◎ | ◎ | X | ◎ |
| | | Light shieling effect | ◎ | ○ | ◎ | ◎ | X | X |

X: a practically unacceptable degree of color unevenness (2) The light shielding effect of the cell spacer in the TN Liquid Crystal Display Cell The polarizing sheets bonded to the liquid crystal display cell were set to the TN normally black mode and the assembly was observed under a transmission microscope at ×200 magnification.

With the drive voltage OFF, the darkness in the center of the spacer and the darkness of the spacer-free liquid crystal area were compared visually by using a panel of 10 assessors.

The evaluation was ◎ when the number of assessors who judged that the darkness in the center of the spacer was deeper or equivalent accounted for 80% or more of the panel, ○ when it accounted for 70 to 80%, A when it accounted for 50 to 70%, and x when it accounted for less than 50%.

The mean cell gap values and the results of evaluation of color unevenness and light shielding effect are shown in Table 1.

EXAMPLES 2 to 4

Except that the compositions shown in Table 1 were used, liquid crystal display cell spacers and cells were fabricated and evaluated in the same manner as in Example 1. The results are shown in Table 1.

COMPARATIVE EXAMPLE 1

Except that uncoated carbon black was used and the composition shown in Table 1 was used, a liquid crystal display cell spacer and a liquid crystal display cell were fabricated and evaluated in the same manner as in Example 1. The results are shown in Table 1.

COMPARATIVE EXAMPLE 2

Except that the composition shown in Table 1 was used with omission of carbon black, a liquid crystal display cell

EXAMPLE 5

Preparation of a Liquid Crystal Display Cell Spacer

To a uniform mixture of 60 parts by weight of tetramethylolmethane triacrylate, 20 parts by weight of divinylbenzene, and 20 parts by weight of acrylonitrile was added 12 parts by weight of carbon black, 6 parts by weight of Phthalocyanine Blue (blue pigment), and 6 parts by weight of Dioxane Violet (violet pigment) as the black pigment component and the black pigment component was evenly dispersed by means of a bead mill for 48 hours.

This colored polymerizable monomer mixture in which said black pigment component had been dispersed was evenly mixed with 2 parts by weight of benzoyl peroxide and the mixture was poured in 850 parts by weight of a 3 weight % aqueous solution of polyvinyl alcohol. After thorough stirring, the mixture was suspended with a homogenizer so that the diameter of droplets of the colored monomer would be about 3 to 10 $\mu$m to provide a suspension.

This suspension was transferred to a 2-L separable flask equipped with a thermometer, stirrer, and reflux condenser and heated to 85° C. in a nitrogen gas atmosphere with constant stirring. This polymerization reaction was carried out for 7 hours, at the end of which time the temperature was raised to 90° C. and the reaction mixture was maintained at that temperature for 3 hours to carry the polymerization reaction to completion. This polymerization reaction mixture was cooled and the resulting colored particles were recovered by filtration, rinsed well with water, and dried to provide 120 parts by weight of colored particles containing dispersing pigment within the size range of 3 to 10 $\mu$m. Colored particles obtained were subjected to classification to provide a liquid crystal display cell spacer with a mean particle diameter of 6.45 $\mu$m and a coefficient of variation in particle size of 2.88%.

The liquid crystal display cell spacer thus obtained was evaluated in the same manner as in Example 1, and a liquid crystal display cell was fabricated and evaluated in the same manner as in Example 1. The results are presented in Table 2.

EXAMPLES 6 TO 8 AND COMPARATIVE EXAMPLES 3 AND 4

Except that the compositions shown in Table 2 were used, liquid crystal display cell spacers and cells were fabricated and evaluated in the same manner as in Example 5. The results are shown in Table 2.

TABLE 2

| | | | Examples | | | | Comparative Examples | |
|---|---|---|---|---|---|---|---|---|
| | | | 5 | 6 | 7 | 8 | 3 | 4 |
| Composition (weight part) | Polymerizable monomer | Tetramethylolmethane triacrylate | 60 | 60 | 60 | — | 60 | 60 |
| | | Divinylbenzene | 20 | 20 | 20 | 50 | 20 | 20 |
| | | Acrylonitrile | 20 | 20 | 20 | — | 20 | 20 |
| | | Ethylene glycol dimethacrylate | — | — | — | 50 | — | — |
| | Carbon | Surface-coated carbon black | — | — | — | — | — | — |
| | | Carbon black | 12 | 10 | 20 | 25 | 30 | — |
| | Pigment | Phthalocyanine blue | 6 | 10 | 5 | 10 | — | 15 |
| | | Dioxazine violet | 6 | 10 | 5 | 10 | — | 5 |
| | | Isoindoline yellow | — | 10 | — | — | — | — |
| | | Quinacridone red | — | — | 15 | — | — | 20 |
| Quality and performance parameters | Spacer quality | Mean particle size ($\mu$m) | 6.45 | 4.17 | 8.63 | 6.29 | 7.03 | 6.72 |
| | | Coefficient of variation of particle size (%) | 2.88 | 3.10 | 2.75 | 2.58 | 3.54 | 4.05 |
| | | Degree of darkness (spectral transmittance) (%) | 2.5 | 2.8 | 2.0 | 1.7 | 1.6 | 76.4 |
| | | Electrical resistance ($\Omega \cdot$ cm) | $10^{14}$ | $10^{14}$ | $10^{14}$ | $10^{19}$ | $<10^{11}$ | $10^{13}$ |
| | Levels of impurities | Sodium ion (ppm) | 0.02 | 0.02 | 0.03 | 0.02 | 0.1 | 0.03 |
| | | Potassium ion (ppm) | 0.05 | 0.02 | 0.03 | 0.02 | 0.1 | 0.03 |
| | | Chloride ion (ppm) | 0.1 | 0.2 | 0.2 | 0.2 | 0.8 | 0.3 |
| | | Sulfate ion (ppm) | 0.5 | 0.3 | 0.3 | 0.4 | 1.2 | 0.4 |
| | Cell quality | Mean cell gap ($\mu$m) | 6.04 | 3.61 | 8.22 | 4.87 | 6.81 | 6.32 |
| | | Evenness of color | ⊚ | ⊚ | ○ | ○ | X | X |
| | | Light shielding effect | ⊚ | ⊚ | ⊚ | ○ | Δ | X |

EXAMPLES 9 and 10

Except that the surface-coated carbon black of Example 1 and the compositions shown in Table 3 were used, liquid crystal display cell spacers and cells were fabricated and evaluated in the same manner as in Example 5.

The results are shown in Table 3.

TABLE 3

| | | | Examples | |
|---|---|---|---|---|
| | | | 9 | 10 |
| Composition (weight part) | Polymerizable monomer | Tetramethylolmethane triacrylate | 50 | 50 |
| | | Divinylbenzene | 30 | 30 |
| | | Acrylonitrile | 10 | 10 |
| | Carbon | Surface-coated carbon black | 6 | 10 |
| | | Carbon black | — | — |
| | Pigment | Phthalocyanine blue | 7 | 15 |
| | | Dioxazine violet | 7 | 5 |
| | | Isoindoline yellow | 7 | 5 |
| | | Quinacridone red | 7 | 20 |
| Quality and performance parameters | Spacer quality | Mean particle size ($\mu$m) | 6.8 | 4.9 |
| | | Coefficient of variation of particle size (%) | 2.94 | 3.6 |
| | | Degree of darkness (spectral transmittance) (%) | 2.9 | 2.7 |
| | | Electrical resistance ($\Omega \cdot$ cm) | $10^{14}$ | $10^{14}$ |
| | Levels of impurities | Sodium ion (ppm) | 0.02 | 0.03 |
| | | Potassium ion (ppm) | 0.02 | 0.01 |
| | | Chloride ion (ppm) | 0.2 | 0.2 |
| | | Sulfate ion (ppm) | 0.4 | 0.5 |
| | Cell quality | Mean cell gap ($\mu$m) | 6.49 | 4.66 |
| | | Evenness of color | ⊚ | ○ |
| | | Light shielding effect | ○ | ⊚ |

INDUSTRIAL APPLICABILITY

Its construction having been described hereinabove, the liquid crystal display cell spacer of the present invention is very satisfactory in coloring effect and light shielding effect and has optimal electrical, physical, chemical, and optical properties. The liquid crystal display cell in corporating this cell spacer shows a good display contrast of the image with the spacer not visualized as luminessent points in the dark area of the image.

What is claimed is:

1. A liquid crystal display cell spacer comprising a pigment component comprising carbon black and at least one set of organic pigments of dissimilar colors other than carbon black, and having a maximum spectral transmittance over the visible wavelength region from about 400 to about 700 nm of less than 3% and having a total light transmittance over the visible wavelength region of 0.1 to 2.5%.

2. The liquid crystal display cell spacer of claim 1 wherein the carbon black is a surface-treated carbon exhibiting improved dispersibility.

3. The liquid crystal display cell spacer of claim 1 wherein the organic pigments are high in transparency, heat resistance, weather resistance and solvent resistance.

4. The liquid crystal display cell spacer of claim 1 having a maximum spectral transmittance over the visible wavelength region from about 400 to about 700 nm of less than 2.7% and having a total light transmittance over the visible wavelength region of 0.2 to 2.0%.

5. The liquid crystal display cell spacer of claim 1 wherein the organic pigments have maximum particle diameter of 1 m.

6. The liquid crystal display cell spacer of claim 1 wherein the preparation of carbon black is 5 to 60% by weight and that of the organic pigments is 95 to 40% by weight.

7. The liquid crystal display cell spacer of claim 1 which further comprises a polymer.

* * * * *